United States Patent  
Symes, Jr. et al.

(10) Patent No.: US 8,305,731 B2
(45) Date of Patent: *Nov. 6, 2012

(54) LEAD AND CADMIUM FREE, LOW TEMPERATURE FIRED X7R DIELECTRIC CERAMIC COMPOSITION AND METHOD OF MAKING

(75) Inventors: Walter J. Symes, Jr., Dundee, NY (US); Mike S. H. Chu, Lewiston, NY (US)

(73) Assignee: Ferro Corporation, Cleveland, OH (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/681,113

(22) PCT Filed: Oct. 27, 2008

(86) PCT No.: PCT/US2008/081246
§ 371 (c)(1),
(2), (4) Date: Apr. 1, 2010

(87) PCT Pub. No.: WO2009/061627
PCT Pub. Date: May 14, 2009

(65) Prior Publication Data
US 2010/0220427 A1    Sep. 2, 2010

Related U.S. Application Data

(60) Provisional application No. 60/985,699, filed on Nov. 6, 2007.

(51) Int. Cl.
*H01G 4/06* (2006.01)
*C04B 35/468* (2006.01)

(52) U.S. Cl. ............. 361/321.4; 501/138; 501/139; 361/321.5

(58) Field of Classification Search .... 361/321.1–321.5, 361/311, 320; 501/137–139
See application file for complete search history.

(56) References Cited

U.S. PATENT DOCUMENTS

| | | |
|---|---|---|
| 4,540,676 A | 9/1985 | Chu et al. |
| 4,816,430 A | 3/1989 | Chu |
| 4,882,305 A | 11/1989 | Chu et al. |
| 5,296,426 A | 3/1994 | Burn |
| 5,571,767 A | 11/1996 | Wilson et al. |
| 6,043,174 A | 3/2000 | Maher |
| 6,723,673 B2 | 4/2004 | Maher et al. |
| 7,521,390 B2 * | 4/2009 | Symes et al. .......... 501/138 |

* cited by examiner

*Primary Examiner* — Eric Thomas
(74) *Attorney, Agent, or Firm* — Rankin, Hill & Clark LLP

(57) ABSTRACT

Multilayer ceramic chip capacitors (MLCC's) which satisfy X7R TCC requirements and which are compatible with silver-palladium internal electrodes. The MLCC's exhibit desirable dielectric properties—high capacitance, low dissipation factor, high insulation resistance, stable TCC—and excellent performance on highly accelerated life testing, and good resistance to dielectric breakdown. The dielectric layers include a lead-free and cadmium-free barium titanate base material doped with other metal oxides such oxides of zinc, boron, bismuth, barium, titanium, praseodymium, cerium, tungsten, neodymium, tungsten, tin, niobium, copper, and/or manganese in various combinations. The dielectric ceramic materials herein can be fired at less than 1150° C. with an inner electrode having 70 wt % or more Ag and 30 wt % or less Pd to form an MLCC.

20 Claims, 1 Drawing Sheet

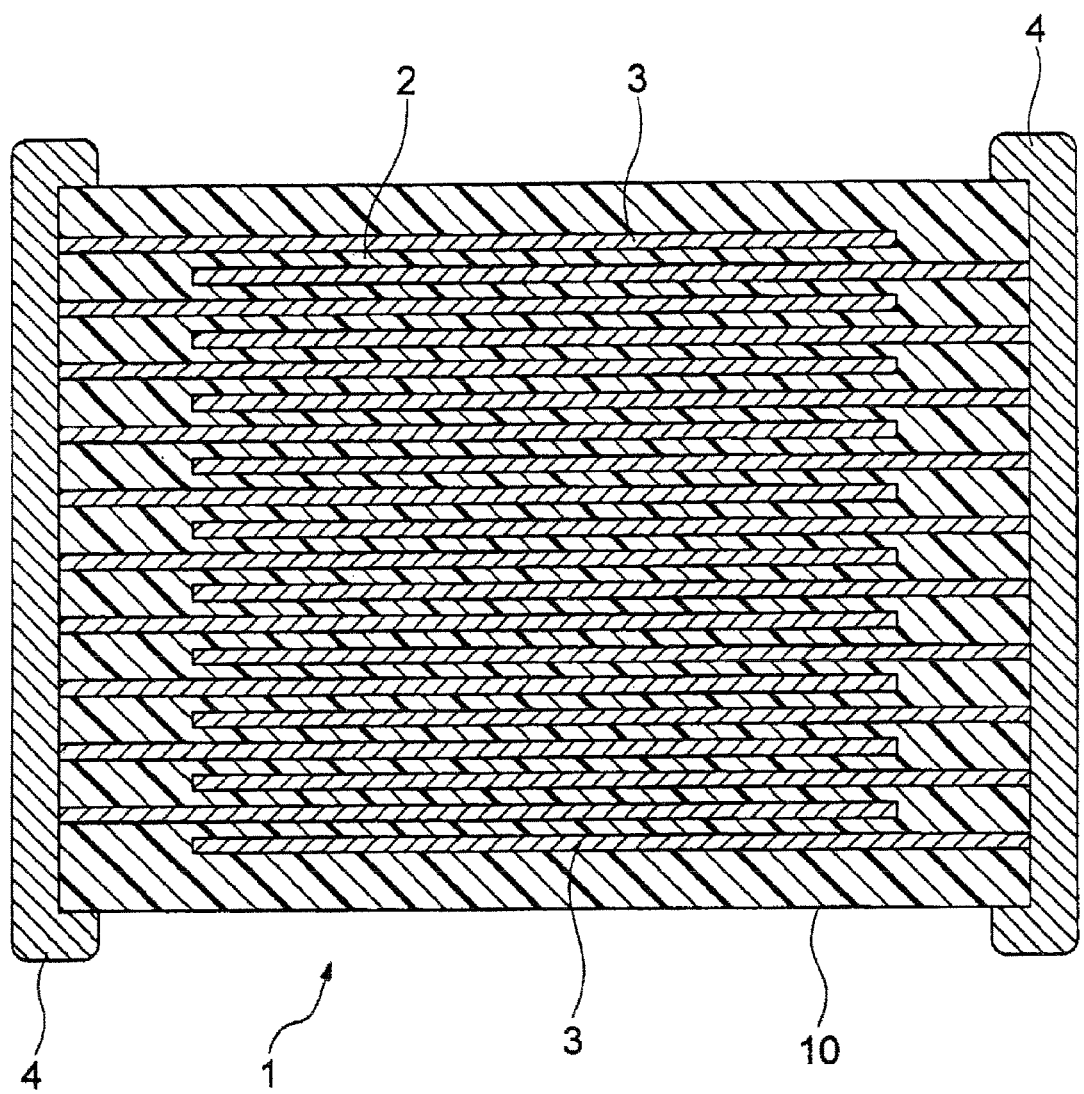

LEAD AND CADMIUM FREE, LOW TEMPERATURE FIRED X7R DIELECTRIC CERAMIC COMPOSITION AND METHOD OF MAKING

BACKGROUND OF THE INVENTION

1. Field of Invention

This invention relates to lead-free and cadmium-free, low temperature fired barium titanate-based dielectric compositions, and more particularly to barium titanate based dielectric compositions having relatively small proportions of guest ions dispersed within the barium titanate crystal matrix. Such a dielectric composition can be used to form multilayer ceramic chip capacitors having internal electrodes formed of palladium or silver, or mixtures or alloys of palladium and silver.

In particular, the present invention relates to a lead and cadmium free, low temperature fired dielectric ceramic composition system in which the dielectric constant does not alter from its base value by more than 15 percent over a wide temperature range. More specifically, this invention relates to a dielectric ceramic composition with a dielectric constant of over 4000 which is formed by firing a base ceramic oxide mixture at a temperature not exceeding 1150° C.

2. Description of Related Art

Multilayer ceramic chip capacitors (MLCC) have been widely utilized as miniature-sized, high capacitance and high reliability electronic components. In accordance with increasing demands for high-performance electronic equipment, multilayer ceramic chip capacitors also have encountered marketplace demand for smaller size, higher capacitance, lower cost, and higher reliability. Tightening environmental regulations militate in favor of capacitors, and hence dielectric compositions that are free of lead and cadmium.

Multilayer ceramic chip capacitors generally are fabricated by forming alternating layers of a dielectric layer-forming paste and an internal electrode forming paste. Such layers are typically formed by sheeting, printing, or similar techniques, followed by concurrent firing. Generally, the internal electrodes have been formed of conductors such as palladium, gold, silver or alloys of the foregoing.

Conventional ceramic dielectric formulations, such as disclosed in U.S. Pat. Nos. 4,816,430 and 4,882,305, lacking lead and cadmium often require sintering temperatures above 1250° C. The addition of lead or cadmium or their compounds, such as disclosed in U.S. Pat. Nos. 4,540,676 and 6,723,673 can reduce sintering temperatures from above 1250° C. to the range of about 1050° C. to about 1150° C. so that metal paste that contains 70 wt % or more silver and 30 wt % or less palladium may be used as inner electrodes.

The Electronic Industry Association (EIA) prescribes a standard for the temperature coefficient of capacitance (TCC) known as the X7R characteristic. The X7R characteristic requires that the change of capacitance be no greater than ±15% over the temperature range from −55° C. to +125° C. In actual practice, capacitance change of not more than ±20% from −30° C. to 125° C. is considered to be temperature stable. The percentage capacitance deviations in the X7R characteristics are measured from a reference temperature of 25° C.

SUMMARY OF THE INVENTION

Based on the foregoing, the art lacks a method of producing a dielectric ceramic composition system that can be fired at less than 1150° C., which has a dielectric constant of greater than 4000, is free of both lead and cadmium in all forms, and is suitable for use with internal Pd/Ag electrodes having 70 wt % or more Ag and 30 wt % or less Pd. Further, the art lacks a dielectric material, which, when fired to form electronic devices, exhibits a stable TCC. Such a material would permit the use of a less costly electrode material, having less Pd (which is relatively expensive) and more Ag (which is relatively inexpensive) such as 70 wt % or more Ag and 30 wt % or less Pd, without sacrificing capacitor performance.

The present invention provides a dielectric composition system that can be used to make ceramic multilayer capacitors compatible with internal electrodes containing 70 wt % or more Ag and 30 wt % or less Pd, either as mixtures or as alloys of the metals. The dielectric materials herein and capacitors made therefrom are devoid of lead and cadmium in any form. The capacitors may be formed from the dielectric composition of the present invention to exhibit a stable dielectric constant with a small dielectric loss.

Broadly, the invention provides lead-free and cadmium-free, low temperature fired barium titanate-based dielectric compositions, and more particularly to barium titanate based dielectric compositions having relatively small proportions of guest ions dispersed within the barium titanate crystal matrix. Possible guest ions include zinc, boron, bismuth, cerium, tungsten, copper, manganese, neodymium, praseodymium, niobium, barium, titanium, or tin in various combinations. Although a variety of combinations of such oxides is contemplated, and may be present, none is obligatory.

In particular, the invention includes a lead-free and cadmium-free ceramic dielectric composition for multilayer ceramic capacitor manufacturing comprising about 85 to about 99 wt % $BaTiO_3$, about 0.05 to about 2.5 wt % ZnO, about 0.01 to about 1.5 wt % $B_2O_3$, about 0.5 to about 4 wt % $Bi_2O_3$, about 0.05 to about 3 wt % $WO_3$, and about 0.01 to about 2 wt % MnO.

The invention further provides a lead-free and cadmium-free ceramic dielectric composition for multilayer ceramic capacitor manufacturing comprising about 96 to about 97 wt % $BaTiO_3$, about 0.3 to about 0.7 wt % ZnO, about 0.01 to about 0.2 wt % $B_2O_3$, about 0.01 to about 2.5 wt % $Bi_2O_3$, about 0.01 to about 1.0 wt % $Pr_6O_{11}+Nd_2O_3+CeO_2$, about 0.4 to about 0.8 wt % $WO_3$, and about 0.01 to about 0.2 wt % MnO.

The invention further provides a multilayer ceramic chip capacitor having a dielectric constant greater than about 4000, a dissipation factor less than about 5%, and a TCC meeting X7R requirements, comprising a fired collection of alternately stacked:

a. layers of a lead-free and cadmium-free ceramic dielectric composition comprising:
   i. about 95 to about 97 wt % $BaTiO_3$,
   ii. about 0.5 to about 0.6 wt % ZnO,
   iii. about 0.01 to about 0.2 wt % $B_2O_3$,
   iv. about 1.6 to about 2.1 wt % $Bi_2O_3$,
   v. about 0.5 to about 0.6 wt % $WO_3$, and
   vi. about 0.01 to about 0.1 wt % MnO, and
b. layers of an internal electrode material selected from the group consisting of silver, palladium, mixtures thereof and alloys thereof.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWING

FIG. 1 is a cross-sectional view of a multilayer ceramic chip capacitor according to a preferred embodiment of the invention.

DETAILED DESCRIPTION OF THE INVENTION

Multilayer chip capacitors are fabricated by alternately stacking dielectric layers and internal electrode layers to form green chips. The layers of the internal electrodes of interest herein are comprised of metals including such as silver/palladium mixtures or alloys, platinum, platinum/palladium mixtures or alloys, platinum/palladium/gold mixtures and alloys, nickel, copper, and nickel/copper mixtures and alloys. The dielectric composition that forms the dielectric layers is produced by wet milling the components of the dielectric with an organic vehicle system. The dielectric composition is deposited on a carrier film, such as polyester, polypropylene, or a belt, such as stainless steel, paper, or a substrate such as alumina or glass, coating the film, and forming sheets, which are alternately stacked with electrodes to form the green chips.

After the green chips are formed, the organic vehicle is removed by heating to a temperature of about 350° C. or less in an air atmosphere. Once the vehicle is removed, the green chips are then fired at about 1050° C. to about 1150° C. in air in a batch kiln or in a tunnel kiln. Various heating profiles may be used both for removing the binder and for firing the chip.

The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 1 and in electrical connection with internal electrode layers 3. The capacitor chip 1 has a plurality of alternately stacked dielectric layers 2. The shape of the capacitor chip 1 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 1. That is, the internal electrode layers 3 of one group are exposed at one side surface of the chip 1 and the internal electrode layers 3 of another group are exposed at the opposite side surface of the chip 1. One external electrode 4 is applied to one side surface of the capacitor chip 1 in electrical contact with the internal electrode layers 3 of the one group, and the other external electrode 4 is applied to the opposite side surface of the chip 1 in electrical contact with the internal electrode layers 3 of the other group.

Most broadly, the dielectric composition of the invention includes about 85 to about 99 wt % $BaTiO_3$, about 0.05 to about 2.5 wt % ZnO, about 0.01 to about 1.5 wt % $B_2O_3$, about 0.5 to about 4 wt % $Bi_2O_3$, about 0.05 to about 3 wt % $WO_3$, and about 0.01 to about 2 wt % MnO.

The invention further provides a lead-free and cadmium-free ceramic dielectric composition for multilayer ceramic capacitor manufacturing comprising about 96 to about 97 wt % $BaTiO_3$, about 0.3 to about 0.7 wt % ZnO, about 0.01 to about 0.2 wt % $B_2O_3$, about 0.01 to about 2.5 wt % $Bi_2O_3$, about 0.01 to about 1.0 wt % $Pr_6O_{11}$+$Nd_2O_3$+$CeO_2$, about 0.4 to about 0.8 wt % $WO_3$, and about 0.01 to about 0.2 wt % MnO.

The invention further provides a multilayer ceramic chip capacitor having a dielectric constant greater than about 4000, a dissipation factor less than about 5%, and a TCC meeting X7R requirements, comprising a fired collection of alternately stacked:
  a. layers of a lead-free and cadmium-free ceramic dielectric composition comprising:
     i. about 95 to about 97 wt % $BaTiO_3$,
     ii. about 0.5 to about 0.6 wt % ZnO,
     iii. about 0.01 to about 0.2 wt % $B_2O_3$,
     iv. about 1.6 to about 2.1 wt % $Bi_2O_3$,
     v. about 0.5 to about 0.6 wt % $WO_3$, and
     vi. about 0.01 to about 0.1 wt % MnO, and
  b. layers of an internal electrode material selected from the group consisting of silver, palladium, mixtures thereof and alloys thereof.

The dielectric compositions herein are lead-free and cadmium free. In a preferred embodiment, the dielectric composition comprises about 90 to about 98 wt % $BaTiO_3$, about 0.1 to about 1.5 wt % ZnO, about 0.01 to about 1 wt % $B_2O_3$, about 1 to about 3 wt % $Bi_2O_3$, about 0.1 to about 2 wt % $WO_3$, and about 0.01 to about 1 wt % MnO. In a more preferred embodiment, the dielectric composition comprises about 95 to about 97 wt % $BaTiO_3$, about 0.5 to about 0.6 wt % ZnO, about 0.01 to about 0.2 wt % $B_2O_3$, about 1.6 to about 2.1 wt % $Bi_2O_3$, about 0.5 to about 0.6 wt % $WO_3$, and about 0.01 to about 0.1 wt % MnO. In an even more preferred embodiment, the dielectric composition includes $BaTiO_3$ to the extent of about 96.2 to about 96.8 wt %.

The dielectric may comprise additional constituents. Broadly, the dielectric composition herein may further comprise one or more selected from the group consisting of: BaO, provided the amount does not exceed 2.5 wt %, $TiO_2$, provided the amount does not exceed 1.5 wt %, $Pr_6O_{11}$, provided the amount does not exceed 2 wt %, $CeO_2$, provided the amount does not exceed 2 wt %, $Nd_2O_3$, provided the amount does not exceed 3 wt %, $SnO_2$, provided the amount does not exceed 2.5 wt %, $Nb_2O_5$, provided the amount does not exceed 1.5 wt %, CuO, provided the amount does not exceed 1.5 wt %, and combinations thereof. In a preferred embodiment, the dielectric compositions herein may further comprise one selected from the group consisting of BaO, provided the amount does not exceed 0.5 wt %, $TiO_2$, provided the amount does not exceed 0.1 wt %, $Pr_6O_{11}$, provided the amount does not exceed 0.3 wt, $CeO_2$, provided the amount does not exceed 0.3 wt %, $Nd_2O_3$ provided the amount does not exceed 0.4 wt %, $SnO_2$, provided the amount does not exceed 0.5 wt %, $Nb_2O_5$, provided the amount does not exceed 0.1 wt %, CuO, provided the amount does not exceed 0.1 wt % and combinations thereof.

Most preferably, the dielectric composition comprises about 96 to about 97 wt % $BaTiO_3$, about 0.3 to about 0.7 wt % ZnO, about 0.01 to about 0.2 wt % $B_2O_3$, about 0.01 to about 2.5 wt % $Bi_2O_3$, about 0.01 to about 1 wt % $Pr_6O_{11}$+$Nd_2O_3$, +$CeO_2$, about 0.4 to about 0.8 wt % $WO_3$, and about 0.01 to about 0.2 wt % MnO. The expression "$Pr_6O_{11}$+$Nd_2O_3$, +$CeO_2$" means that any or all of the indicated oxides is present in the indicated amounts.

The invention further provides a multilayer ceramic chip capacitor having a dielectric constant greater than about 4000, a dissipation factor less than about 5%, and a TCC meeting X7R requirements, comprising a fired collection of alternately stacked layers of any dielectric material disclosed herein together with layers of an internal electrode material selected from the group consisting of silver, palladium, mixtures thereof and alloys thereof.

The dielectric composition of the present invention comprises a uniform dense microstructure of grains having an average diameter of about 0.5 to about 3 microns. A uniform and dense grain microstructure is critical in achieving high reliability multilayer capacitors having dielectric layers thinner than 5' microns.

In one embodiment, as described below, the dielectric composition of the present invention comprises, prior to firing, a blend of the oxides of $BaTiO_3$, $ZnO$, $B_2O_3$, $Bi_2O_3$, $WO_3$, and $MnO$ as in column A of Table 1. Preferred and more preferred embodiments are found in columns B and C of Table 1. Throughout the specification and appended claims, it is presumed that each numerical value is preceded by the word "about," unless specifically stated otherwise. To the embodiments of Table 1 may be added one or more additional oxides as set forth in Table 2. The broadest range of additional oxides is found in column A of Table 2, followed by successively more preferred ranged of additional oxides in columns B and C of Table 2.

TABLE 1

Primary oxide formulations of dielectric compositions for Embodiments A-C.

| Oxides wt % | A | B | C |
| --- | --- | --- | --- |
| $BaTiO_3$ | 85.00-99.00 | 90.00-98.00 | 95.4-96.8 |
| $ZnO$ | 0.05-2.50 | 0.10-1.50 | 0.5-0.6 |
| $B_2O_3$ | 0.01-1.50 | 0.01-1.00 | 0.01-0.2 |
| $Bi_2O_3$ | 0.50-4.00 | 1.00-3.00 | 1.6-2.1 |
| $WO_3$ | 0.05-3.00 | 0.10-2.00 | 0.5-0.6 |
| $MnO$ | 0.01-2.00 | 0.01-1.00 | 0.01-0.10 |

TABLE 2

Secondary oxides which may be included in Embodiments A-C.

| Oxides wt % | A | B | C |
| --- | --- | --- | --- |
| $BaO$ | 0-2.5 | 0-1.5 | 0.01-0.5 |
| $TiO_2$ | 0-1.5 | 0-1 | 0.01-0.1 |
| $Pr_6O_{11}$ | 0-2 | 0-1 | 0.01-0.3 |
| $CeO_2$ | 0-2 | 0-1 | 0.01-0.3 |
| $Nd_2O_3$ | 0-3 | 0-1 | 0.01-0.4 |
| $SnO_2$ | 0-2.5 | 0-1.5 | 0.01-0.5 |
| $Nb_2O_5$ | 0-1.5 | 0-1 | 0.01-0.1 |
| $CuO$ | 0-1.5 | 0-1 | 0.01-0.1 |

In the embodiments of Table 2, the use of one or more of $BaO$, $TiO_2$, $Pr_6O_{11}$, $CeO_2$, $Nd_2O_3$, $SnO_2$, $Nb_2O_5$ and $CuO$ is contemplated, in addition to the embodiments of Table 1.

It is well known to those who are familiar with the art that any or all of the oxides disclosed herein, (except $BaTiO_3$) can be pre-blended to form a pre-mix or pre-reacted to form an intermediate compound. The effect will be the same so long as the final composition, expressed as oxides, is the same. It is apparent to those skilled in the art that metal salts such as carbonates, nitrates, hydroxides, oxalates, acetates, and organometallic compounds have the same effect, so long as the desired metal ion is provided in the desired quantity.

Other compounds may be present in the dielectric material provided that the other compound does not adversely affect dielectric properties. Such compounds are usually found in the raw materials as impurities.

The dielectric compositions herein possess fine crystal grains that typically have a mean size of 0.5-3 microns, with a grain size of less than 0.7 micron being preferred. Each dielectric layer has a thickness of up to about 50 microns. Preferably, the thickness of each dielectric layer is from about 0.5 microns to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life.

The number of dielectric layers stacked in a chip capacitor is generally from about 2 to about 800, and more preferably from about 3 to about 400. The multilayer ceramic chip capacitor of the invention generally is fabricated by forming a green chip by conventional printing and sheeting methods using pastes, and firing the chip. After firing, the chip is tumbled dry in a medium such as alumina or silica to round off corners, a conductive paste, containing silver or silver/palladium mixtures or alloys, for example, is then applied to both ends to connect the exposed inner electrodes together to make terminations. The chip is then termination fired at about 800° C. in air to sinter the conductor (i.e., silver) into a solid conduction pad at both ends, to form a multilayer capacitor. The terminations are external electrodes 4 as shown in FIG. 1.

Dielectric Pastes. A paste for forming the dielectric layers can be obtained by mixing an organic vehicle with a raw dielectric material, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 microns, and more preferably about 1 micron or less.

Organic Vehicle. The organic vehicle is a binder in an organic solvent or a binder in water. The binder used herein is not critical; conventional binders such as ethyl cellulose, polyvinyl butanol, ethyl cellulose, and hydroxypropyl cellulose, and combinations thereof are appropriate in combination with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich. Alternatively, the binder could be selected from polyvinyl alcohol (PVA), polyvinyl acetate (PVAC) in combination with water.

No particular limit is imposed on the organic vehicle content of the respective pastes (dielectric or electrode pastes). Often the paste contains about 1 to 5 wt % of the binder and about 10 to 50 wt % of the organic solvent, with the balance being either the metal component (for an electrode) or a dielectric component (for a dielectric layer). If desired, the respective pastes may contain up to about 10 wt % of other additives such as dispersants, plasticizers, and insulating compounds.

Internal Electrode. A paste for forming internal electrode layers is obtained by mixing an electro-conductive material with an organic vehicle. The conductive material used herein includes conductors such as silver and palladium metals and their alloys as mentioned herein and various compounds which convert into such conductors upon firing, for example, oxides, organometallic compounds and resinates. An example of a suitable Ag/Pd paste is EL44-032 Ag/Pd paste, which contains 70 wt % Ag and 30 wt % Pd, from Ferro Corporation.

With reference to FIG. 1, the conductor that forms the internal electrode layers 3 is usually a silver/palladium mixture or alloy. The thickness of the internal electrode layers may be determined to suit a particular application, but the layers are typically up to about 5 microns thick. Preferably, an internal electrode layer has a thickness of about 0.5 to about 3 microns and more preferably about 1 to about 2 microns.

External Electrode. The conductor that forms the external electrodes 4 is usually Ag or a mixture or alloy of Ag and Pd. The thickness of the external electrode layers may be determined to suit a particular application, but the layers are typically up about 10 to about 50 microns thick, preferably about 20 to about 40 microns thick. Paste for forming external electrodes is prepared by the same method as for the internal electrodes.

A green chip then may be prepared from the dielectric layer-forming paste and the internal electrode layer-forming paste. In the case of a printing method, a green chip is prepared by alternately printing the pastes onto a substrate of a polyester film, (e.g., polyethylene terephthalate (PET)), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. The organic vehicle may be removed ("drying") under conventional conditions, by heating at a rate of 0.01° C. to 20° C./hour, more preferably about 0.03-0.1° C./hour, with a hold temperature of about 150° C.-350° C., more preferably about 250° C., and a hold time of about 30-700 minutes, more preferably about 200-300 minutes in an air atmosphere. After the organic vehicle is removed from the green chip, it is fired. The chip may be allowed to cool to room temperature before firing or fired directly after the organic vehicle is removed, without cooling.

Firing. The dried green chip is then fired in air, at a temperature from about 1050° C. to about 1150° C. The dielectric compositions herein require no more than 1150° C. to effect full fusion of the dielectric and sintering of the electrodes. The firing temperature is held for about two hours to enhance densification. Lower hold temperatures provide insufficient densification whereas higher hold temperatures can lead to very large grains. The firing temperature ramp is typically 5° C. per minute, although other ramp rates (per minute) of 1° C., 2° C., 10° C., 15° C. or 20° C. can be used.

The organic vehicle removal and firing may be carried out either continuously or separately. If continuously, the process includes organic vehicle removal, raising the temperature to the firing temperature without cooling, holding at that temperature for a specified time and cooling afterwards. If separately, after organic vehicle removal and cooling down, the temperature of the chip is raised to the sintering temperature. The resulting chip may be polished at end faces by barrel tumbling and sand blasting, for example, before the external electrode-forming paste is printed or transferred and fired to form external electrodes (terminations). Firing of the external electrode-forming paste may be carried out in air at about 600° C. to 800° C., for about 10 minutes to about 1 hour. If necessary, pads are formed on the external electrodes by plating or other methods known in the art. The multilayer ceramic chip capacitors of the invention can be mounted on printed circuit boards, for example, by soldering.

In general, the dielectric compositions herein can be used to make a multilayer ceramic chip capacitor having a dielectric constant greater than about 4000, a dissipation factor less than about 5%, and a TCC meeting X7R requirements, wherein the dielectric comprises a fired collection of alternately stacked layers of the any dielectric material described elsewhere herein and layers of an internal electrode material selected from the group consisting of silver, palladium, and mixtures thereof and alloys thereof.

Further, the invention also embraces a method of forming an electronic component comprising: alternately applying layers of any dielectric material described elsewhere herein and layers of a metal-containing electrode paste comprising silver and palladium, onto a substrate to form a stack, and firing the stack at a temperature not exceeding 1150° C. such that the dielectric fuses and the metal sinters.

EXAMPLES

Multilayer ceramic capacitors with Ag/Pd electrodes where Ag content is about 70 wt % and Pd content is about 30 wt %, 20 active layers, each layer having a thickness of 5 to 15 microns were prepared and sintered in air at 1050° C. to 1150° C. Physical and electrical measurements were then carried out. The fired chips exhibit a dielectric constant over 4000, DF less than 5.00% at 1 KHz, stable TCC from −30° C. to +125° C., RC greater than 1000 seconds at 25° C., and RC greater than 100 seconds at 125° C. The dielectric breakdown voltage exceeds 70 V/micron. The following exemplary compositions are provided to illustrate preferred aspects of the invention and are not intended to limit the scope of the invention.

Examples 1-7

Dielectric compositions were formed by mixing, blending, and/or milling in water appropriate amounts of the oxides as shown in Table 3.

TABLE 3

Compositions of Examples 1-7

| Example | 1 | 2 | 3 | 4 | 5 | 6 | 7 |
|---|---|---|---|---|---|---|---|
| $BaTiO_3$ | 96.352 | 96.211 | 96.756 | 96.383 | 96.230 | 96.288 | 95.446 |
| ZnO | 0.524 | 0.522 | 0.522 | 0.526 | 0.522 | 0.522 | 0.521 |
| $B_2O_3$ | 0.100 | 0.100 | 0.100 | 0.101 | 0.100 | 0.100 | 0.100 |
| $Bi_2O_3$ | 2.079 | 2.059 | 1.639 | 2.072 | 2.059 | 2.060 | 2.060 |
| BaO | 0.000 | 0.000 | 0.000 | 0.000 | 0.000 | 0.000 | 0.475 |
| $TiO_2$ | 0.000 | 0.063 | 0.000 | 0.000 | 0.063 | 0.000 | 0.000 |
| $Pr_6O_{11}$ | 0.291 | 0.000 | 0.000 | 0.000 | 0.000 | 0.000 | 0.000 |
| $CeO_2$ | 0.000 | 0.291 | 0.000 | 0.000 | 0.291 | 0.292 | 0.292 |

TABLE 3-continued

Compositions of Examples 1-7

| Example | 1 | 2 | 3 | 4 | 5 | 6 | 7 |
|---|---|---|---|---|---|---|---|
| $Nd_2O_3$ | 0.000 | 0.106 | 0.334 | 0.286 | 0.107 | 0.000 | 0.000 |
| $WO_3$ | 0.593 | 0.587 | 0.587 | 0.591 | 0.587 | 0.587 | 0.588 |
| $SnO_2$ | 0.000 | 0.000 | 0.000 | 0.000 | 0.000 | 0.000 | 0.466 |
| $Nb_2O_5$ | 0.000 | 0.000 | 0.000 | 0.000 | 0.000 | 0.100 | 0.000 |
| CuO | 0.020 | 0.020 | 0.020 | 0.000 | 0.000 | 0.020 | 0.020 |
| MnO | 0.040 | 0.040 | 0.040 | 0.040 | 0.040 | 0.030 | 0.030 |

After milling, the powders were dried and pulverized. The final powders had average particle sizes of 0.4-0.9 micron. One hundred grams of each of the above powders was then added with 28.8 grams of an organic vehicle comprising polyvinyl butanol, toluene, and methanol, and wet milled for 24 hours to prepare a slurry for tape casting. The wet slurry was coated on a polyester film to form dielectric green tapes. The thickness of the dielectric green tapes was from about 20 to about 30 microns depending on the specific testing to be performed on them. Electrodes of 70 wt % Ag/30 wt % Pd were printed onto the dried green dielectric tape by conventional screen-printing methods using conventional Ag/Pd pastes. A total of 20 sheets, plus top and bottom cover layers without electrode printing, were stacked and bonded under a pressure of 5100 psi [~347 atmospheres] and a temperature of 130° F. to form a green chip. After dicing to a suitable dimension so that, after sintering and shrinkage, (which is typically from 15% to 20% in both length and width directions), the chip dimension is about 0.120"(L)×0.060"(W) (EIA1206 size), the green chip was heated to remove the organic vehicle in accordance with the burn-out cycle of Table 4.

TABLE 4

Binder Removal Conditions.

| Stage | Temp (° C.) | Duration (hours) | Atmosphere |
|---|---|---|---|
| Ramp from room temp | 255 | 20 | Air |
| Soak | 255 | 6 | Air |
| Cool | 25 | 4 | Air |

Upon cooling to room temperature, the chips using the powders of Table 3. (Examples 1-7) were fired under the conditions set forth in Table 5 in a Nabertherm batch kiln in air to obtain a multilayer capacitor chips.

TABLE 5

Firing Conditions for Examples 1-7

| Stage | Temp (° C.) | Duration (hours) | Atmosphere |
|---|---|---|---|
| Ramp | 1050-1150 | 4-6 | Air |
| Soak | 1050-1150 | 4-6 | Air |
| Cool | 25 | 4-6 | Air |

For all examples, chips were placed on a $ZrO_2$ setter and sintered in air at a temperature from 1050° C. to 1150° C. Chips thus obtained were corner rounded by tumbling. An external electrode forming Ag paste available as TK33-008 from Ferro Corporation of Cleveland, Ohio was applied to the end faces and fired in air at 720° C. for about 15 minutes to form external electrodes. The multilayer capacitor thus processed had dimensions of about 0.120" (L)×0.06" (W) (EIA1206 size) with various heights. The dielectric layers were 10 to 15 microns thick, and the internal silver/palladium electrode layers were about 1.5 microns thick. A value such as "1120/2" means the firing was carried out at a hold temperature of 1120° C. for 2 hours.

These multilayer chip capacitors were then measured for their electrical properties of Capacitance (Cap.), Dissipation Factor (DF), Temperature Characteristics (TCC), at a test frequency of 1 KHz and a test voltage of 1.0 V RMS. Insulation Resistance (IR), and Breakdown Voltage (BDV) were also measured. When the physical dimensions of the chips, their active dielectric thickness, and number of active dielectric layers are known, the Dielectric Constant (K), Insulation Resistance×Capacitance Constant (RC), and Breakdown Strength of the composition can be calculated. The results are shown in Table 6.

TABLE 6

Summary of Electrical Properties of Examples 1-7

| Example | Firing (° C./Hr.) | Thickness (μm) | Capacitance (nF) | DF (%) | Calculated K | TCC −30° C. (%) | TCC 85° C. (%) | TCC 125° C. (%) | RC 25° C. (sec.) | RC 125° C. (sec.) | Breakdown (V/μm) |
|---|---|---|---|---|---|---|---|---|---|---|---|
| 1 | 1115/3 | 10.6 | 158.4 | 4.83 | 4655 | −22.0 | −7.0 | −8.1 | 11873 | 761 | 69 |
| 2 | 1120/3 | 10.0 | 169.4 | 4.65 | 4259 | −13.8 | −4.0 | −4.0 | 28870 | 2023 | 82 |
| 3 | 1080/4 | 10.6 | 147.7 | 4.59 | 4011 | −21.9 | −8.0 | −18.4 | 16087 | 245 | 83 |
| 4 | 1080/3 | 9.7 | 172.2 | 4.32 | 4453 | −15.7 | −6.7 | −6.3 | 24576 | 816 | 101 |
| 5 | 1080/2 | 9.6 | 145.6 | 5.62 | 4021 | −20.8 | 1.7 | −7.4 | 810 | 13 | 71 |
| 6 | 1120/2 | 10.0 | 180.2 | 5.34 | 4746 | −20.9 | −5.0 | −7.3 | 14340 | 329 | 82 |
| 7 | 1120/2 | 11.6 | 133.8 | 3.81 | 3896 | −4.9 | −1.7 | 2.9 | 42966 | 2659 | 69 |

K = Capacitance × (1/8.854E-14) × (Thickness/(L × W)) × (1/N)
L = Length of active electrode (cm)
W = Width of active electrode (cm)
N = Number of active dielectric layers
RC = Capacitance (nF) × Insulation Resistance (G-Ohm)

The exemplary chips made from the compositions of Examples 1-7 have very high dielectric constants, low DF, dense microstructure, and high breakdown strength. The TCCs are measured as a percentage change from the reference temperature of 25° C., and are stable, meeting the X7R criteria, from −30° C. to +125° C. RC 25° C. and RC 125° C. are all very high, except for Example 5. However these low RC values Example 5 could be due to measurement error since the breakdown voltage of Example 5 is still quite high, which indicates that the insulation resistance of Example 5 is high.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A lead-free and cadmium-free ceramic dielectric composition for multilayer ceramic capacitor manufacturing comprising:
 a. about 85 to about 99 wt % $BaTiO_3$,
 b. about 0.05 to about 2.5 wt % ZnO,
 c. about 0.01 to about 1.5 wt % $B_2O_3$,
 d. about 0.5 to about 4 wt % $Bi_2O_3$,
 e. about 0.05 to about 3 wt % $WO_3$, and
 f. about 0.01 to about 2 wt % MnO.

2. The dielectric composition of claim 1 further comprising one or more selected from the group consisting of:
 a. BaO, provided the amount does not exceed 2.5 wt %,
 b. $TiO_2$, provided the amount does not exceed 1.5 wt %,
 c. $Pr_6O_{11}$, provided the amount does not exceed 2 wt %,
 d. $CeO_2$, provided the amount does not exceed 2 wt %,
 e. $Nd_2O_3$, provided the amount does not exceed 3 wt %,
 f. $SnO_2$, provided the amount does not exceed 2.5 wt %,
 g. $Nb_2O_5$, provided the amount does not exceed 1.5 wt %, and
 h. CuO, provided the amount does not exceed 1.5 wt %.

3. The dielectric composition of claim 1 wherein the composition comprises:
 a. about 90 to about 98 wt % $BaTiO_3$,
 b. about 0.1 to about 1.5 wt % ZnO,
 c. about 0.01 to about 1 wt % $B_2O_3$,
 d. about 1 to about 3 wt % $Bi_2O_3$,
 e. about 0.1 to about 2 wt % $WO_3$, and
 f. about 0.01 to about 1 wt % MnO.

4. The dielectric composition of claim 3, further comprising one or more selected from the group consisting of:
 a. BaO, provided the amount does not exceed 1.5 wt %,
 b. $TiO_2$, provided the amount does not exceed 1 wt %,
 c. $Pr_6O_{11}$, provided the amount does not exceed 1 wt %,
 d. $CeO_2$, provided the amount does not exceed 1 wt %,
 e. $Nd_2O_3$, provided the amount does not exceed 1 wt %,
 f. $SnO_2$, provided the amount does not exceed 1.5 wt %,
 g. $Nb_2O_5$, provided the amount does not exceed 1 wt %, and
 h. CuO, provided the amount does not exceed 1 wt %.

5. The dielectric composition of claim 1 wherein the composition comprises:
 a. about 95 to about 97 wt % $BaTiO_3$,
 b. about 0.5 to about 0.6 wt % ZnO,
 c. about 0.01 to about 0.2 wt % $B_2O_3$,
 d. about 1.6 to about 2.1 wt % $Bi_2O_3$,
 e. about 0.5 to about 0.6 wt % $WO_3$, and
 f. about 0.01 to about 0.1 wt % MnO.

6. The dielectric composition of claim 5, further comprising one or more selected from the group consisting of:
 a. BaO, provided the amount does not exceed 0.5 wt %,
 b. $TiO_2$, provided the amount does not exceed 0.1 wt %,
 c. $Pr_6O_{11}$, provided the amount does not exceed 0.3 wt %,
 d. $CeO_2$, provided the amount does not exceed 0.3 wt %,
 e. $Nd_2O_3$, provided the amount does not exceed 0.4 wt %,
 f. $SnO_2$, provided the amount does not exceed 0.5 wt %,
 g. $Nb_2O_5$, provided the amount does not exceed 0.1 wt %, and
 h. CuO, provided the amount does not exceed 0.1 wt %.

7. The ceramic dielectric composition of claim 5, comprising:
 a. about 95.5 wt % $BaTiO_3$,
 b. about 0.5 wt % ZnO,
 c. about 0.1 wt % $B_2O_3$,
 d. about 2.1 wt % $Bi_2O_3$,
 e. about 0.5 wt % BaO,
 f. about 0.3 wt % $CeO_2$,
 g. about 0.6 wt % $WO_3$,
 h. about 0.5 wt % $SnO_2$,
 i. about 0.02 wt % CuO, and
 j. about 0.03 wt % MnO.

8. A lead-free and cadmium-free ceramic dielectric composition for multilayer ceramic capacitor manufacturing comprising:
 a. about 96 to about 97 wt % $BaTiO_3$,
 b. about 0.3 to about 0.7 wt % ZnO,
 c. about 0.01 to about 0.2 wt % $B_2O_3$,
 d. about 0.01 to about 2.5 wt % $Bi_2O_3$,
 e. about 0.01 to about 1.0 wt % $Pr_6O_{11}+Nd_2O_3+CeO_2$,
 f. about 0.4 to about 0.8 wt % $WO_3$, and
 g. about 0.01 to about 0.2 wt % MnO.

9. A multilayer ceramic chip capacitor having a dielectric constant greater than about 4000, a dissipation factor less than about 5%, and a TCC meeting X7R requirements, the chip capacitor comprising a fired collection of alternately stacked:
 a. layers of the dielectric material of claim 8; and
 b. layers of an internal electrode material selected from the group consisting of silver, palladium, mixtures thereof and alloys thereof.

10. The dielectric composition of claim 9, wherein $BaTiO_3$ is present in an amount of from about 96.2 to about 96.8 wt %.

11. The dielectric composition of claim 9, further comprising about 0.01 to about 0.3 wt % CuO.

12. The dielectric composition of claim 9, further comprising about 0.01 to about 0.1 wt % $TiO_2$.

13. The dielectric composition of claim 9, wherein the composition comprises:
 a. about 96.4 wt % $BaTiO_3$,
 b. about 0.5 wt % ZnO,
 c. about 0.1 wt % $B_2O_3$,
 d. about 2.1 wt % $Bi_2O_3$,
 e. about 0.3 wt % $Pr_6O_{11}$,
 f. about 0.6 wt % $WO_3$,
 g. about 0.02 wt % CuO, and
 h. about 0.04 wt % MnO.

14. A multilayer ceramic chip capacitor having a dielectric constant greater than about 4000, a dissipation factor less than about 5%, and a TCC meeting X7R requirements, the chip capacitor comprising a fired collection of alternately stacked:
 a. layers of the dielectric material of claim 13; and
 b. layers of an internal electrode material selected from the group consisting of silver, palladium, mixtures thereof and alloys thereof.

15. The dielectric composition of claim 9, wherein the composition comprises:
a. about 96.2 wt % $BaTiO_3$,
b. about 0.5 wt % ZnO,
c. about 0.1 wt % $B_2O_3$,
d. about 2.1 wt % $Bi_2O_3$,
e. about 0.1 wt % $TiO_2$,
f. about 0.3 wt % $CeO_2$,
g. about 0.1 wt % $Nd_2O_3$,
h. about 0.6 wt % $WO_3$,
i. about 0.02 wt % CuO, and
j. about 0.04 wt % MnO.

16. The dielectric composition of claim 9, wherein the composition comprises:
a. about 96.4 wt % $BaTiO_3$,
b. about 0.5 wt % ZnO,
c. about 0.1 wt % $B_2O_3$,
d. about 2.1 wt % $Bi_2O_3$,
e. about 0.3 wt % $Nd_2O_3$,
f. about 0.6 wt % $WO_3$, and
g. about 0.04 wt % MnO.

17. A multilayer ceramic chip capacitor having a dielectric constant greater than about 4000, a dissipation factor less than about 5%, and a TCC meeting X7R requirements, comprising a fired collection of alternately stacked:
a. layers of a lead-free and cadmium-free ceramic dielectric composition comprising:
  i. about 85 to about 99 wt % $BaTiO_3$,
  ii. about 0.05 to about 2.5 wt % ZnO,
  iii. about 0.01 to about 1.5 wt % $B_2O_3$,
  iv. about 0.5 to about 4 wt % $Bi_2O_3$,
  v. about 0.05 to about 3 wt % $WO_3$, and
  vi. about 0.01 to about 2 wt % MnO, and
b. layers of an internal electrode material selected from the group consisting of silver, palladium, mixtures thereof and alloys thereof.

18. The multilayer ceramic chip capacitor of claim 17 wherein:
a. the layers of the lead-free and cadmium-free ceramic dielectric composition comprise:
  i. about 95 to about 97 wt % $BaTiO_3$,
  ii. about 0.5 to about 0.6 wt % ZnO,
  iii. about 0.01 to about 0.2 wt % $B_2O_3$,
  iv. about 1.6 to about 2.1 wt % $Bi_2O_3$,
  v. about 0.5 to about 0.6 wt % $WO_3$, and
  vi. about 0.01 to about 0.1 wt % MnO.

19. The capacitor of claim 18, wherein the internal electrode material comprises at least 70 wt % or more silver and 30 wt % or less palladium.

20. The capacitor of claim 17, wherein the internal electrode material comprises at least 70 wt % or more silver and 30 wt % or less palladium.

* * * * *